United States Patent
Miyata

(10) Patent No.: US 10,324,518 B2
(45) Date of Patent: Jun. 18, 2019

(54) IMAGE FORMING APPARATUS, CONTROL METHOD OF IMAGE FORMING APPARATUS, AND PROGRAM

(71) Applicant: CANON KABUSHIKI KAISHA, Tokyo (JP)

(72) Inventor: Takaaki Miyata, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/672,876

(22) Filed: Aug. 9, 2017

(65) Prior Publication Data

US 2017/0336852 A1 Nov. 23, 2017

Related U.S. Application Data

(63) Continuation of application No. 14/994,008, filed on Jan. 12, 2016, now Pat. No. 9,746,905, which is a (Continued)

(30) Foreign Application Priority Data

Jul. 5, 2011 (JP) ................................. 2011-148846

(51) Int. Cl.
*G06F 1/32* (2019.01)
*G06F 1/3234* (2019.01)
*G06F 1/3215* (2019.01)
*H04N 1/00* (2006.01)
*H04N 1/32* (2006.01)

(52) U.S. Cl.
CPC .......... *G06F 1/3275* (2013.01); *G06F 1/3215* (2013.01); *H04N 1/00891* (2013.01); *H04N 1/00896* (2013.01); *H04N 1/00928* (2013.01); *H04N 1/00952* (2013.01); *H04N 1/32625* (2013.01); *H04N 1/32673* (2013.01); *H04N 2201/0081* (2013.01); *H04N 2201/0082* (2013.01); *H04N 2201/0093* (2013.01); *Y02D 10/159* (2018.01)

(58) Field of Classification Search
CPC ............................ G06F 1/3275; G06F 1/3215
USPC .......................................... 713/300, 320, 323
See application file for complete search history.

(56) References Cited

U.S. PATENT DOCUMENTS

2007/0027942 A1* 2/2007 Trotter ................ G06F 11/0718
2007/0234093 A1* 10/2007 Kimura ................ G06F 1/3203
713/323

(Continued)

*Primary Examiner* — Robert E Fennema
*Assistant Examiner* — Santosh R Poudel
(74) *Attorney, Agent, or Firm* — Canon U.S.A., Inc. IP Division

(57) ABSTRACT

An information processing apparatus includes, a reception unit configured to receive an instruction to transfer the information processing apparatus to the second power state, an analysis unit configured, when the reception unit receives the instruction, to analyze a factor limiting the transfer of the information processing apparatus to the second power state, and a control unit configured, when the analysis unit analyzes the factor and as a result the factor is a first factor, to control the information processing apparatus to transfer to the third power state without waiting until the factor is resolved, and configured, when the factor is a second factor, to control the information processing apparatus to wait until the factor is resolved, and to transfer to the second power state.

26 Claims, 6 Drawing Sheets

Related U.S. Application Data continuation of application No. 13/539,891, filed on Jul. 2, 2012, now Pat. No. 9,253,352.

(56) References Cited

U.S. PATENT DOCUMENTS

| | | | | |
|---|---|---|---|---|
| 2008/0049250 | A1* | 2/2008 | Sugishita | G03G 15/5004 358/1.15 |
| 2008/0114996 | A1* | 5/2008 | Suzuki | G03G 15/5004 713/320 |
| 2011/0276813 | A1* | 11/2011 | Kamijima | G06F 1/3293 713/320 |
| 2011/0292446 | A1* | 12/2011 | Kojima | G03G 15/5004 358/1.15 |

* cited by examiner

FIG.3

| ON COMMUNICATING VIA TELEPHONE LINE |
| --- |
| ON EXECUTING PRINT JOB |
| OCCURRENCE OF ERROR |
| ABSENCE OF TURNING OFF OF POWER SOURCE FOR MORE THAN ONE MONTH |

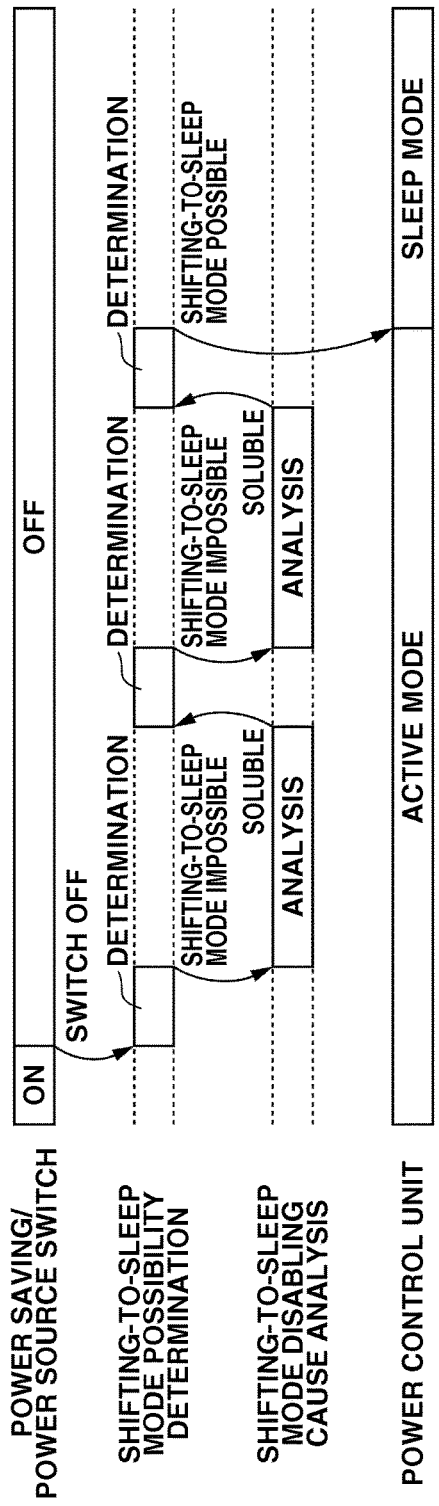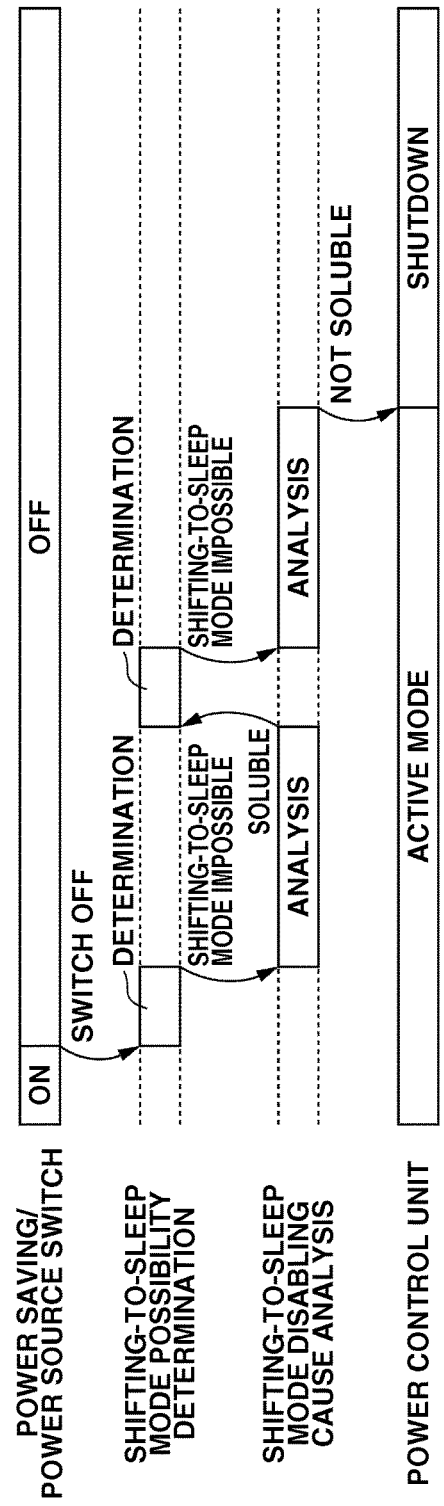

IMAGE FORMING APPARATUS, CONTROL METHOD OF IMAGE FORMING APPARATUS, AND PROGRAM

CROSS-REFERENCE TO RELATED APPLICATIONS

This application is a continuation of U.S. patent application Ser. No. 14/994,008, filed Jan. 12, 2016, which is a continuation of U.S. patent application Ser. No. 13/539,891, filed Jul. 2, 2012, now U.S. Pat. No. 9,253,352, which claims the benefit of Japanese Patent Application No. 2011-148846, filed Jul. 5, 2011, all of which are hereby incorporated by reference herein in their entirety.

BACKGROUND OF THE INVENTION

Field of the Invention

The present invention relates to an image forming apparatus, a control method of the image forming apparatus, and a program.

Description of the Related Art

Recently, a technique in which a time period required for startup of software is shortened has been established as a power saving technique. In the technique, an apparatus shifts to a sleep mode in which only a Dynamic Random Access Memory (DRAM) is energized when the apparatus is not used for a certain period of time or when a switch of the electronic apparatus is turned OFF, and when the switch of the electronic apparatus is turned ON in the next time, the electronic apparatus is returned from the sleep mode. Japanese Patent Laid-open Publication No. 07-17111 discusses the above technique or applying to an image forming apparatus.

In the image forming apparatus to which the above described sort of power saving technique is applied, there is a case where the image forming apparatus is not allowed to shift to the sleep mode when a switch thereof is turned OFF. Examples of the case where the image forming apparatus is not allowed to shift to the sleep mode include, for example, a case where some abnormality occurs in the image forming apparatus or when the image forming apparatus is in running some processing that disables normal processing of the image forming apparatus upon returning from the sleep mode if the processing is interrupted for the purpose of the shifting to the sleep mode.

When the turning OFF of the switch does not affect on a power supply of a drive unit of the image forming apparatus (i.e., when the power supply to the drive unit is not mechanically turned OFF even when the switch is turned OFF), even when the image forming apparatus is not allowed to shift to the sleep mode, no cause occurs even if the image forming apparatus does not shift to the sleep mode immediately.

However, when the turning OFF of the switch mechanically turns OFF the power supply of the drive unit of the image forming apparatus (i.e., when the turning OFF of the switch mechanically turns OFF the power supply to the drive unit), the image forming apparatus needs to promptly shift to, for example, the sleep mode even when the image forming apparatus is not allowed to shift to the sleep mode. Therefore, in the image forming apparatus to which the above described sort of power saving technique is applied, when the image forming apparatus is not allowed to shift to the sleep mode, by the turning OFF of the switch, the image forming apparatus does not shift to the sleep mode but shuts down.

However, especially when a power saving function is effective, a user expects that the turning OFF of the switch allows the image forming apparatus to shift to the sleep mode not shut down. Therefore, when the switch is turned OFF, it is desirable that the image forming apparatus shift to the sleep mode as many cases as possible.

SUMMARY OF THE INVENTION

The present invention provides a system in which, even when the image forming apparatus is not allowed to shift to a sleep mode when a power saving/power source switch thereof is turned OFF, the image forming apparatus can shift to a sleep mode as many cases as possible when a cause that disables the shifting to the sleep mode can be solved according to the time course.

According to an aspect of the present invention, an information processing apparatus showing a first power state, a second power state consuming lower power than the first power state, and a third power state consuming lower power than the second power state, includes a reception unit configured to receive an instruction to transfer the information processing apparatus to the second power state, an analysis unit configured, when the reception unit receives the instruction, to analyze a factor limiting the transfer of the information processing apparatus to the second power state, and a control unit configured, when the analysis unit analyzes the factor and as a result the factor is a first factor, to control the information processing apparatus to transfer to the third power state without waiting until the factor is resolved, and configured, when the factor is a second factor, to control the information processing apparatus to wait until the factor is resolved, and to transfer to the second power state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates examples of shifting-to-sleep mode disabling causes of the present exemplary embodiment.

FIGS. 5A and 5B are a timing chart of each processing to be executed when an operation for turning OFF a power saving/power source switch from its ON state is performed by a user in the image forming apparatus of the first exemplary embodiment.

DESCRIPTION OF THE EMBODIMENTS

Various exemplary embodiments, features, and aspects of the invention will be described in detail below with reference to the drawings.

A description is made as to a first exemplary embodiment.

Figure 1:
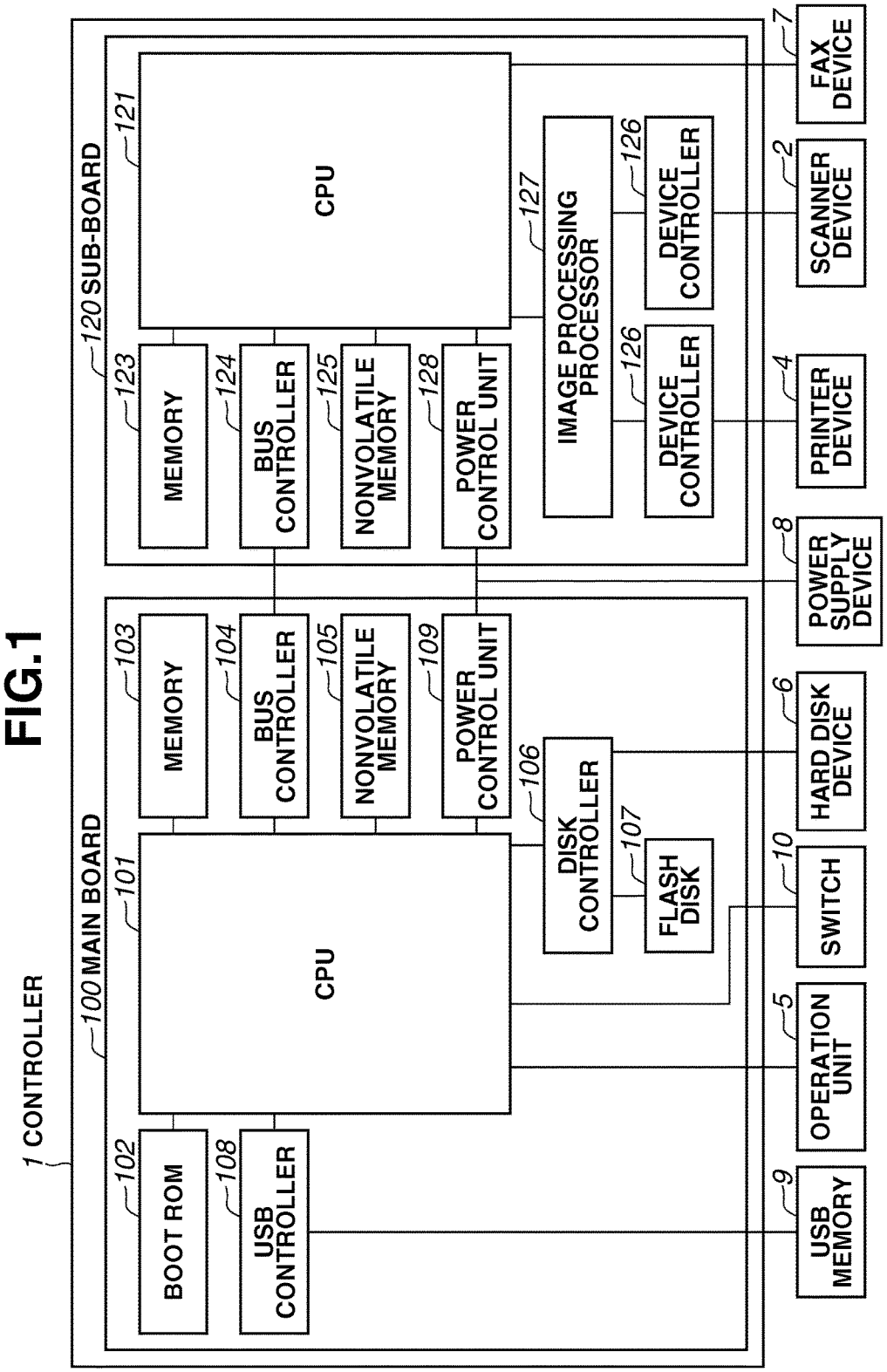
FIG. 1 is a block diagram illustrating an example of a configuration of an image forming apparatus according to an exemplary embodiment of the present invention.

FIG. 1 is a block diagram illustrating an example of a configuration of an image forming apparatus according to an exemplary embodiment of the present invention. A description will be made below, with reference to FIG. 1, as to a controller of the image forming apparatus as a module to which the present invention is specifically applied.

In FIG. 1, a controller 1 controls the image forming apparatus. The controller 1 includes a main board 100 and a sub-board 120. The main board 100 is a general-purpose central processing unit (CPU) system. The main board 100 includes a CPU 101, a boot read-only memory (ROM) 102, a memory 103, a bus controller 104, a nonvolatile memory 105, a disk controller 106, a flush disk 107, a Universal Serial Bus (USB) controller 108, and a power control unit 109.

The CPU 101 controls the main board 100 in its entirety. The boot ROM 102 stores a boot program. The memory 103 is used by the CPU 101 as a work memory.

The bus controller 104 has a bridge function that establishes a connection with an external bus. The nonvolatile memory 105 can keep data even when the power supply is cut. The disk controller 106 controls a storage device such as a flush disk (e.g., SSD) 107 and a hard disk device 6. The flush disk (e.g., SSD) 107 is a storage device that is composed of a semiconductor device and has a relatively small capacity. The USB controller 108 controls a USB memory 9.

The main board 100 is supplied with power from a power supply device 8. A power control unit 109 controls a power supply to each unit on the main board 100 that requires the power supply. The USB memory 9, an operation unit 5, and a hard disk device 6 are connected to the main board 100 outside. The hard disk device 6 is not necessarily a hard disk but may be any storage device as far as it is a nonvolatile device.

The sub-board 120 is composed of a relatively small general-purpose CPU system and an image processing hardware. The sub-board 120 includes a CPU 121, a memory 123, a bus controller 124, a nonvolatile memory 125, an image processing processor 127, and device controllers 126. The CPU 121 controls the sub-board 120 in its entirety. The memory 123 is used by the CPU 121 as a work memory. The bus controller 124 has a bridge function for establishing a connection with an external bus. The nonvolatile memory 125 can keep data even when the power supply is cut. The image processing processor 127 performs real-time digital image processing.

The device controllers 126 control external devices. An external scanner device 2 and an external printer device 4 transmit digital image data via the device controllers 126. A facsimile (FAX) device 7 is directly controlled by the CPU 121.

The sub-board 120 is supplied with power from the power supply device 8. A power control unit 128 controls power supply to each unit on the sub-board 120 that requires power. A switch 10 is a power saving/power source switch for changing a power supply state of the image forming apparatus. The switch 10 receives a power supply ON/OFF operation from the user. When the user operates the switch 10, an interruption is input into the CPU 101. When the CPU 101 detects the interruption, the CPU 101 controls the power control units 109 and 128 according to the state of the image forming apparatus.

FIG. 1 is a simplified block diagram. For example, each of the CPU 101 and the CPU 121 includes a lot of pieces of CPU peripheral hardware such as a chipset, a bus bridge, and a clock generator, which, however, are omitted here because an illustration thereof is not essential in view of granularity of description. Therefore, the configuration of the block diagram of FIG. 1 does not limit the scope of the present invention.

An operation of the controller 1 will be described below by exemplifying copying of an image onto a paper device. When the user instructs to copy an image via an operation unit 5, the CPU 101 transmits an image read-out command to the scanner device 2 via the CPU 121. The scanner device 2 optically scans a paper document, converts thus scanned image of the paper document into digital image data, and inputs the digital image data into the image processing processor 127 via the device controller 126. The image processing processor 127 transmits thus input digital image data to the memory 123 via the CPU 121 according to a direct memory access (DMA) transfer and causes the memory 123 to temporally store the digital image data.

When the CPU 101 can confirm that a certain amount of or a full amount of the digital image data is input into the memory 123, the CPU 101 outputs an image output instruction to the printer device 4 via the CPU 121. The CPU 121 shows the image processing processor 127 an area where the image data is stored in the memory 123. The image data on the memory 123 is transmitted to the printer device 4 via the image processing processor 127 and the device controller 126 according to a synchronizing signal from the printer device 4 and is printed onto a paper device (i.e., recording sheet) in the printer device 4.

In making a plurality of copy sets, the CPU 101 causes the hard disk device 6 to store the image data of the memory 123. Accordingly, the CPU 101 can transmit the image to the printer device 4 to print the image in the printer device 4 with respect to the copy sets on and after the second copy set without necessity to acquire the image from the scanner device 2.

Figure 2:
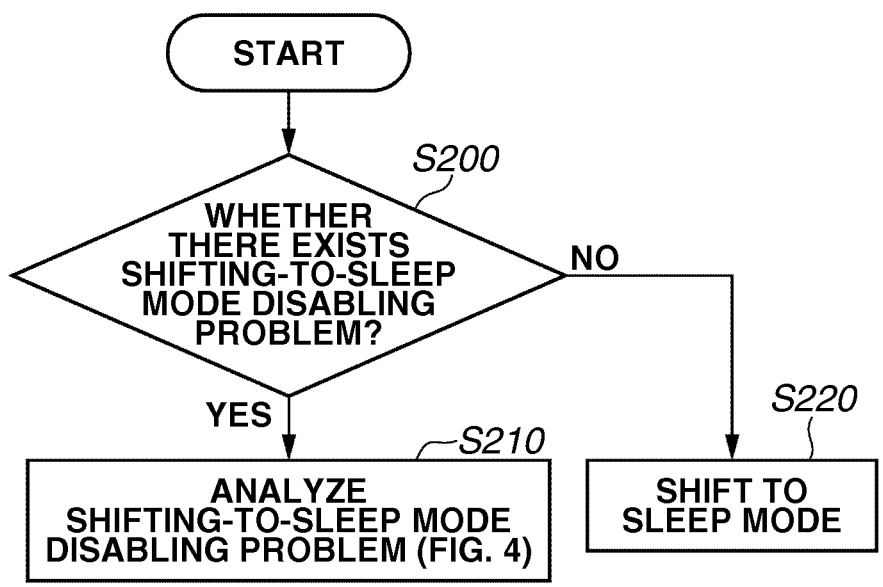
FIG. 2 is a flow chart illustrating an example of shifting-to-sleep mode possibility determination processing in the image forming apparatus of the present invention.

The image forming apparatus according to the present exemplary embodiment can shift to the sleep mode in which power supply to units other than a specific unit (e.g., other than the memory 103) of the image forming apparatus is cut. FIG. 2 is a flow chart illustrating an example of a shifting-to-sleep mode possibility determination processing performed in the image forming apparatus of the present invention. Each step is numbered S200 through S220. The steps are realized such that the CPU 101 reads out a program that is computer readably stored in the boot ROM 102 or the hard disk device 6 to run the program.

The shifting-to-sleep mode possibility determination processing (i.e., first determination processing) is started when the switch 10 is turned OFF (i.e., when the user operates to turn OFF the switch 10), or when it is determined that the shifting-to-sleep mode disabling cause is soluble according to the time course in the shifting-to-sleep mode disabling cause analysis processing. Detailed description of each step will be made below.

In step S200, the CPU 101 detects (i.e., determines) whether there exists the shifting-to-sleep mode disabling cause. Examples of a case where there exists the shiftingto-sleep mode disabling cause include a case where some abnormality occurs in the image forming apparatus or when the image forming apparatus is in running some processing that disables normal processing of the image forming apparatus upon returning from the sleep mode if the processing is interrupted for the purpose of the shifting to the sleep mode. FIG. 3 illustrates specific examples of the shifting-to-sleep mode disabling cause.

FIG. 3 illustrates examples of the shifting-to-sleep mode disabling cause of the present exemplary embodiment. Specifically, the shifting-to-sleep mode disabling cause occurs during execution of communication via a telephone line, during execution of a print job, upon occurrence of an error, in the absence of the turning OFF of the power supply for more than one month. The above cases are mere examples of the shifting-to-sleep mode disabling cause and thus do not limit the scope of the present invention. The reason why the image forming apparatus is not allowed to shift to the sleep mode in the above described examples will be described below. In a case of the "on communicating via a telephone line", suppose the image forming apparatus shifts to the sleep mode by turning OFF the switch 10, when the image forming apparatus returns to the normal mode, a state of the communication via the telephone line does not return to a state immediately before the image forming apparatus having shifted to the sleep mode. As a result thereof, the image forming apparatus is not allowed to shift to the sleep mode but is caused to be "shut down".

Similarly, also, in a case of the "on executing a print job", suppose the image forming apparatus shift to the sleep mode by turning OFF the switch 10, when the image forming apparatus returns to the normal mode, a state of the printer drive unit does not return to a state immediately before the image forming apparatus having shifted to the sleep mode. As a result thereof, the image forming apparatus is not allowed to shift to the sleep mode but is caused to be "shut down".

In a case of the "upon occurrence of an error", since an error remains when the image forming apparatus returns to the normal mode after the image forming apparatus shifts to the sleep mode by turning OFF the switch 10, the image forming apparatus is not allowed to shift to the sleep mode but is caused to be "shut down". In a case of the "in the absence of the turning OFF of the power source for more than one month", the image forming apparatus does not shift to the sleep mode by turning OFF the switch 10 but is caused to be "shut down" in consideration with a possible accumulation of malfunctions, e.g., memory leakage, of the software.

As described above, all the shifting-to-sleep mode disabling causes are preliminary listed up to store the list in the hard disk device 6 or the like. In step S200, the CPU 101 checks the state of the image forming apparatus against the above list to make a determination whether there is the shifting-to-sleep mode disabling cause.

The description returns to the flow chart of FIG. 2 below. In step S200, in a case where it is determined that there exists the shifting-to-sleep mode disabling cause (YES in step S200), the processing proceeds to step S210. At the time, the CPU 101 performs increment of the number of executions of the shifting-to-sleep mode possibility determination processing stored in the memory 103 (not illustrated).

In step S210, since there is the shifting-to-sleep mode disabling cause, the CPU 101 analyzes the cause (i.e., shifting-to-sleep mode disabling cause analysis processing).

The shifting-to-sleep mode disabling cause analysis processing will be described below in detail with reference to FIG. 4.

On the other hand, in step S200, in a case where it is determined that there is no shifting-to-sleep mode disabling cause (NO in step S200), the CPU 101 advances the processing to step S220. At the time, the CPU 101 resets the number of executions of the shifting-to-sleep mode possibility determination processing stored in the memory 103 to "0" (not illustrated).

In step S220, since there is no shifting-to-sleep mode disabling cause, the CPU 101 causes the image forming apparatus to shift to the sleep mode. Specifically, the CPU 101 controls such that the power control units 109 and 128, for example, energize only the memory 103, whereas, shut off the power supply to the other units.

Figure 4:
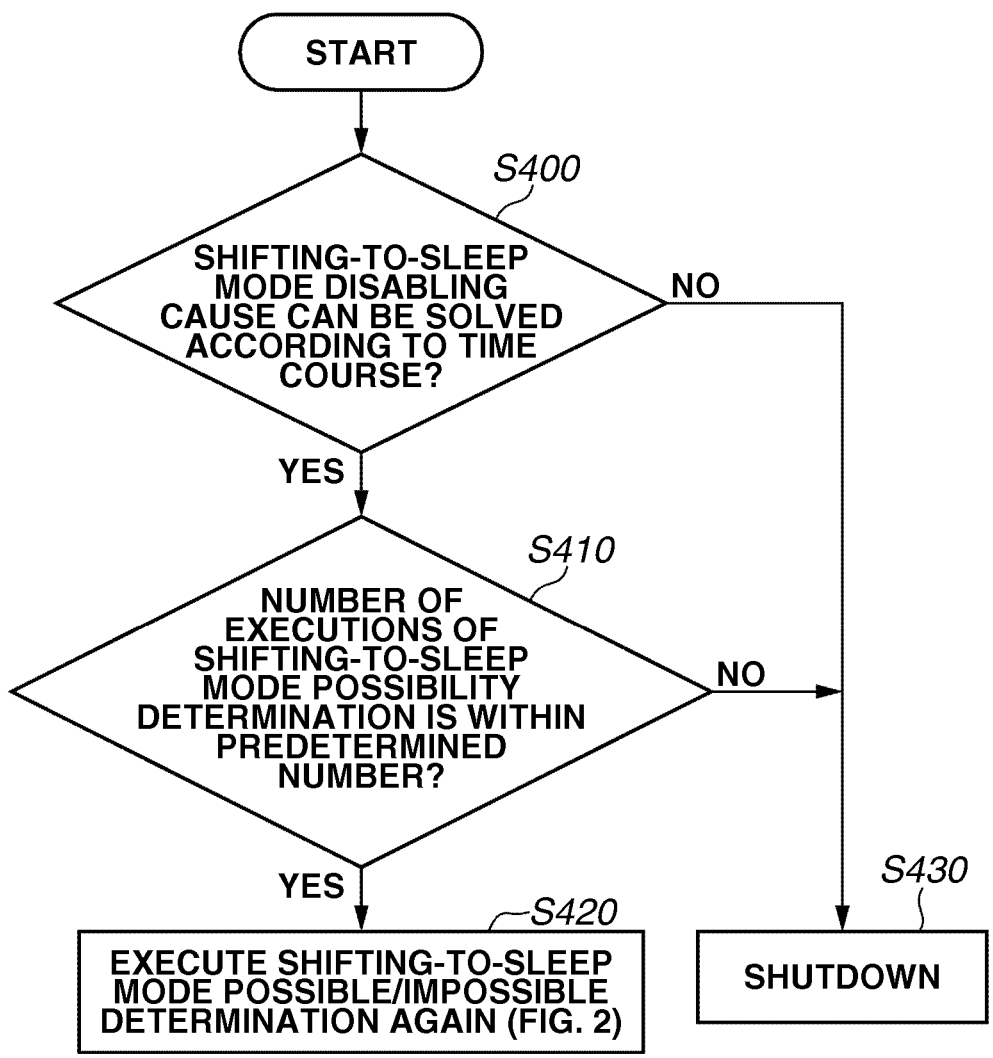
FIG. 4 is a flow chart illustrating an example of shifting-to-sleep mode disabling cause analysis processing in a first exemplary embodiment.

FIG. 4 is a flow chart illustrating an example of the shifting-to-sleep mode disabling cause analysis processing in the first exemplary embodiment. Each step is numbered by S400 through S430. The steps are realized such that the CPU 101 reads out a program that is computer readably recorded in the boot ROM 102 or the hard disk device 6 to run the program.

The shifting-to-sleep mode disabling cause analysis processing is started when the shifting-to-sleep mode disabling cause is detected in the shifting-to-sleep mode possibility determination processing of FIG. 2 and analyzes whether the shifting-to-sleep mode disabling cause is soluble according to the time course. Each step is described below in detail.

In step S400, the CPU 101 analyzes (i.e., judges) whether the shifting-to-sleep mode disabling cause is soluble according to the time course (i.e., second determination processing). The shifting-to-sleep mode disabling cause may sometimes be, but sometimes not be, solved according to the time course. For example, the causes of the "on communicating via a telephone line" and the "on executing of a print job" can be eventually solved i.e., are shifting-to-sleep mode disabling causes which are soluble according to the time course. To the contrary, the problems of the "upon occurrence of an error" and the "in the absence of the turning OFF of the power source for a long time (e.g., for more than one month)" are shifting-to-sleep mode disabling causes which are not soluble according to the time course.

As described above, all the shifting-to-sleep mode disabling causes are preliminary classified to those which are soluble according to the time course and those which are not soluble according to the time course and the classified information is stored in the hard disk device 6 or the like. In step S400, the determination whether the shifting-to-sleep mode disabling causes can be solved according to the time course is made with reference to the above described classified information.

In step S400, when it is determined that the shifting-to-sleep mode disabling cause can be solved according to the time course (YES in step S400), the CPU 101 advances the processing to step S410. On the other hand, when it is determined that the shifting-to-sleep mode disabling cause cannot be solved according to the time course (NO in step S400), the CPU 101 advances the processing to step S430.

In step S410, the CPU 101 determines whether the number of executions of the shifting-to-sleep mode possibility determination processing of FIG. 2 is within the predetermined number. When it is determined that the number of executions of the shifting-to-sleep mode possibility determination processing is within the predetermined number (YES in step S410), the CPU 101 advances the processing to step S420. In step S420, the CPU 101 controls to execute the shifting-to-sleep mode possibility determination again after, for example, a certain time period has elapsed. In other words, the image forming apparatus of the present exemplary embodiment controls, even when it is determined that the shifting-to-sleep mode disabling cause is solved according to the time course, such that the shifting-to-sleep mode possibility determination processing is repeated up to the predetermined number as a limit (i.e., redetermination execution processing).

On the other hand, when it is determined that the number of executions of the shifting-to-sleep mode possibility determination processing is not within the predetermined number (i.e., the number of executions of the shifting-to-sleep mode possibility determination processing reaches the predetermined number) (NO in step S410), the CPU 101 advances the processing to step S430.

In step S430, the CPU 101 causes the image forming apparatus to shut down. Specifically, in the image forming apparatus of the present exemplary embodiment, when it is determined that the shifting-to-sleep mode disabling cause is not solved according to the time course or when it is determined that the shifting-to-sleep mode disabling cause is solved according to the time course and the shifting-to-sleep mode possibility determination processing has already been repeated for the predetermined number, the CPU 101 controls such that the image forming apparatus is shut down. In the shut down processing, the CPU 101 controls such that the power control units 109 and 128 shut off all the power supply to the image forming apparatus.

As described above, the image forming apparatus can be controlled as follows. The image forming apparatus is not immediately shut down even when the image forming apparatus cannot shift to the sleep mode immediately after the power saving/power source switch 10 is turned OFF. The image forming apparatus can be shut down only when the shifting-to-sleep mode disabling cause is not solved according to the time course or only when the shifting-to-sleep mode possibility determination is repeated for more than the predetermined number.

FIG. 5 is a timing chart of each processing to be executed when the user operates to turn ON or turn OFF the power saving/power source switch 10 in the image forming apparatus of the first exemplary embodiment.

FIG. 5A illustrates a state that a plurality of the shifting-to-sleep mode disabling causes are successively detected in the shifting-to-sleep mode possibility determination, wherein the causes are soluble according to the time course and are actually solved according to the time course, and therefore the image forming apparatus is allowed to shift to the sleep mode.

Specifically, when the switch 10 is turned OFF and thereafter the shifting-to-sleep mode possibility determination is performed to find that the image forming apparatus is not allowed to shift to the sleep mode, wherein, however, the analysis of the shifting-to-sleep mode disabling cause shows that the shifting-to-sleep mode disabling cause is soluble according to the time course, the shifting-to-sleep mode possibility determination is performed again. FIG. 5A illustrates a state in which the above processing is performed again to make a determination in the subsequent shifting-to-sleep mode possibility determination that the image forming apparatus can shift to the sleep mode because the shifting-to-sleep mode disabling cause has already been solved, resulting in causing the image forming apparatus to shift to the sleep mode.

To the contrary, FIG. 5B illustrates a state in which a plurality of shifting-to-sleep mode disabling causes are successively detected in the shifting-to-sleep mode possibility determination, wherein the causes are originally soluble according to the time course but thereafter a cause that cannot be solved according to the time course occurs, resulting in causing the image forming apparatus to be shut down.

Specifically, after the switch 10 is turned OFF, the shifting-to-sleep mode possibility determination is performed to cause the image forming apparatus not to shift to the sleep mode. In the first shifting-to-sleep mode disabling cause analysis, the shifting-to-sleep mode disabling cause can be solved according to the time course. However, in the second shifting-to-sleep mode disabling cause analysis, it is found that another shifting-to-sleep mode disabling cause that cannot be solved according to the time course occurs and therefore it is determined that the image forming apparatus is not allowed to shift to the sleep mode, resulting in causing the image forming apparatus to shut down.

As described above, in the image forming apparatus of the present invention, even if the shifting-to-sleep mode disabling cause is detected at the time when the power saving/power source switch (i.e., switch 10) is turned OFF, if the shifting-to-sleep mode disabling cause is soluble according to the time course, the image forming apparatus is not shut down immediately. Accordingly, the likelihood that the image forming apparatus can shift to the sleep mode can be increased.

A second exemplary embodiment will be described below. In the first exemplary embodiment, all the shifting-to-sleep mode disabling causes are preliminary classified to those which can be solved according to the time course and those which cannot be solved according to the time course and, based on the classification, in step S400 of FIG. 4, a determination is made whether the shifting-to-sleep mode disabling cause can be solved according to the time course.

In the second exemplary embodiment, the determination whether the shifting-to-sleep mode disabling cause can be solved according to the time course is made by confirming whether the shifting-to-sleep mode disabling cause is solved by allowing a certain time period to actually elapse. The other configurations are completely identical to those of the first exemplary embodiment.

A third exemplary embodiment will be described below. In also the third exemplary embodiment, similar to the second exemplary embodiment, a determination whether the shifting-to-sleep mode disabling cause can be solved according to the time course can be made by confirming whether the shifting-to-sleep mode disabling cause is solved by allowing the certain time period to actually elapse. A configuration of the third exemplary embodiment will be described below in detail.

Figure 6:
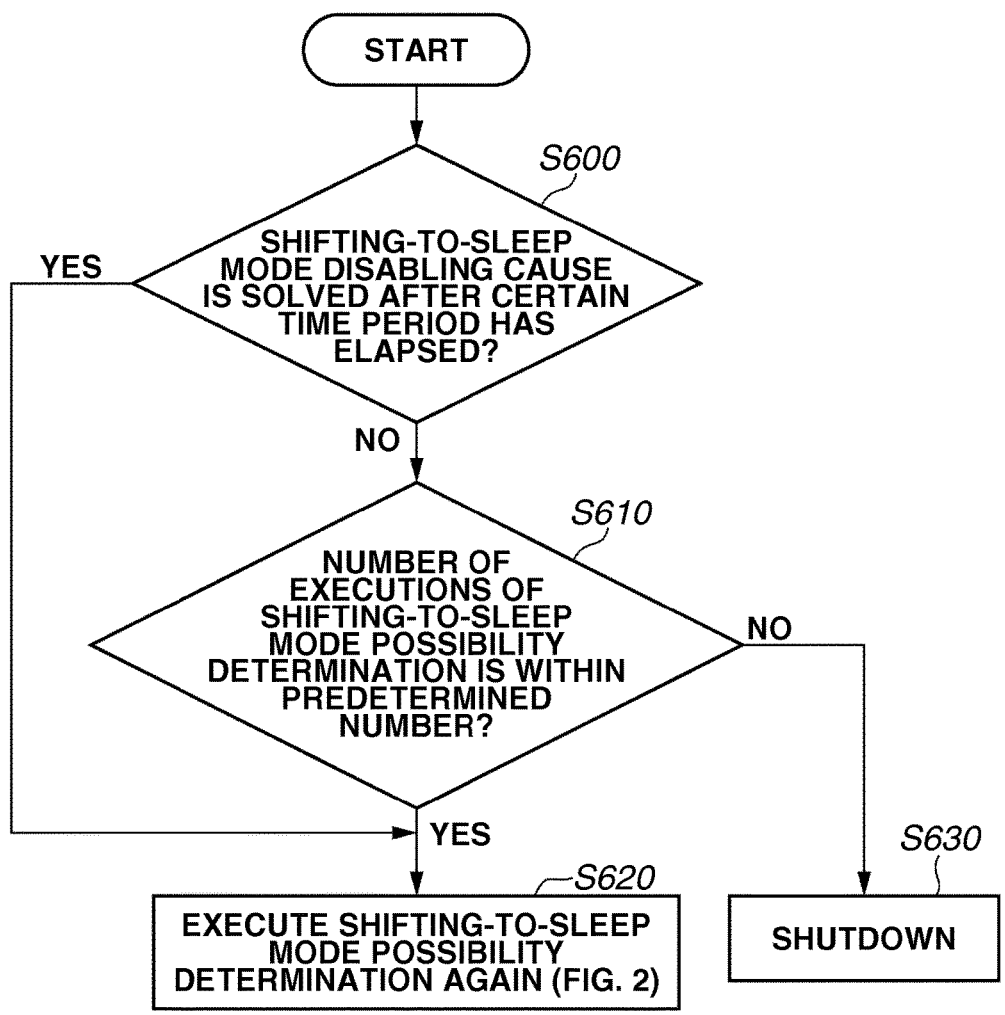
FIG. 6 is a flow chart illustrating another example of shifting-to-sleep mode disabling cause analysis processing in a third exemplary embodiment.

FIG. 6 is a flow chart illustrating an example of the shifting-to-sleep mode disabling cause analysis processing in the third exemplary embodiment. Processing of the flow chart is realized such that the CPU 101 reads out a program that is computer readably stored in the boot ROM 102 or the hard disk device 6 to run the program.

The shifting-to-sleep mode disabling cause analysis processing is started when the shifting-to-sleep mode disabling cause is detected in the shifting-to-sleep mode possibility determination processing of FIG. 2. The shifting-to-sleep mode disabling cause analysis processing analyzes whether the shifting-to-sleep mode disabling cause is soluble according to the time course. Each step will be described below in detail.

When the shifting-to-sleep mode disabling cause analysis processing is started, in step S600, the CPU 101 waits for a predetermined time period to determine whether the shifting-to-sleep mode disabling cause is actually solved according to the time course (i.e., third determination processing).

When it is determined that the shifting-to-sleep mode disabling cause is solved after the certain time period has elapsed (YES in step S600), the CPU 101 advances the processing to step S620. In step S620, for example, after a certain time period has elapsed, the CPU 101 controls such that the shifting-to-sleep mode possibility determination processing is re-executed (i.e., redetermination execution processing). Alternatively, when it is determined that the shifting-to-sleep mode disabling cause is solved after the certain time period has elapsed (YES in step S600), the CPU 101 may advance the processing to step S220 of FIG. 2 where the CPU 101 control such that the image forming apparatus shifts to the sleep mode.

On the other hand, when it is determined that the shifting-to-sleep mode disabling cause is not solved even after the certain time period has elapsed (NO in step S600), the CPU 101 advances the processing to step S610. In step S610, the CPU 101 determines whether the number of executions of the shifting-to-sleep mode possibility determination processing of FIG. 2 is within the predetermined number. When it is determined that the number of executions of the shifting-to-sleep mode possibility determination processing is within the predetermined number (YES in step S610), the CPU 101 advances the processing to step S620. In a case where it is determined that the shifting-to-sleep mode disabling cause is not solved also after the image forming apparatus of the present exemplary embodiment waits for a certain time period, the CPU 101 controls such that the shifting-to-sleep mode possibility determination processing is repeated up to the predetermined number as a limit.

On the other hand, when it is determined that the number of executions of the shifting-to-sleep mode possibility determination processing is not within the predetermined number (i.e., the number of executions of the shifting-to-sleep mode possibility determination processing reaches the predetermined number) (NO in step S610), the CPU 101 advances the processing to step S630.

In step S630, the CPU 101 causes the image forming apparatus to shut down. In other words, in the image forming apparatus of the present exemplary embodiment, when it is determined that the shifting-to-sleep mode disabling cause is not solved and the shifting-to-sleep mode possibility determination processing has been repeated for the predetermined number, the CPU 101 controls such that the image forming apparatus is shut down.

The other configurations are completely identical to those of the first exemplary embodiment. As described above, the CPU 101 can control such that the image forming apparatus is not immediately shut down, immediately after the power saving/power source switch is turned OFF, even when the image forming apparatus cannot shift to the sleep mode, whereas, the image forming apparatus is shut down only when the shifting-to-sleep mode disabling cause is not solved after a certain time period has elapsed and the shifting-to-sleep mode possibility determination has been repeated for more than the predetermined numbers.

The configurations and the contents of the above described various types of data are not limited to those of the present exemplary embodiments; however, needless to say, they may be configured in accordance with uses and/or purposes thereof. In the above exemplary embodiment, the present invention is exemplified by the image forming apparatus; however, the present invention can be formed into any embodiment such as a system, a device, a method, a program, and a storage medium. Specifically, the present invention may be applied to a system composed of a plurality of devices or may be applied to a singular device. All the configurations made of a combination of the above exemplary embodiments are also embraced within the scope of the present invention.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A control method for controlling a printing apparatus, comprising:
   receiving an instruction for turning off the printing apparatus;
   performing, if a shift condition for shifting the printing apparatus into a predetermined power saving state has been satisfied after the receiving of the instruction, first processing for shifting the printing apparatus into the predetermined power saving state; and
   performing, in accordance with a length of a period that has elapsed without satisfaction of the shifting condition after the receiving of the instruction, second processing for shifting the printing apparatus into a shutdown state, power consumption in which is lower than power consumption in the predetermined power saving state.

2. The control method according to claim 1, further comprising:
   shifting, upon receiving another instruction for turning on the printing apparatus, the printing apparatus into a predetermined power state, in which power consumption is higher than the power consumption in the predetermined power saving state,
   wherein time taken to shift the printing apparatus that is in the predetermined power saving state into the predetermined power state is shorter than time taken to shift the printing apparatus that is in the shutdown state into the predetermined power saving state.

3. The control method according to claim 1,
   wherein, in the predetermined power saving state, power is supplied to a part only of a controller of the printing apparatus, is not supplied to other part of the controller, and is not supplied to a printer device of the printing apparatus.

4. The control method according to claim 3,
wherein the part of the controller includes a volatile memory.

5. The control method according to claim 3,
wherein, in the shutdown state, power is supplied to none of the part of the controller, the other part of the controller, and the printer device.

6. The control method according to claim 1,
wherein the first processing is performed if the shift condition is satisfied after receiving the instruction, and
wherein the second processing is performed if a length of the period that has elapsed without satisfaction of the shifting condition after receiving the instruction exceeds a predetermined length.

7. The control method according to claim 1, further comprising:
determining at least once whether the shift condition is satisfied or not after receiving the instruction,
wherein the first processing is performed if it is determined that the shift condition is satisfied, and
wherein the second processing is performed if it is determined a predetermined number of times that the shift condition is not satisfied.

8. The control method according to claim 1,
wherein the printing apparatus has a switch that is able to be operated by a user, and
wherein the instruction is received when the switch is turned off.

9. The control method according to claim 1,
wherein the shift condition includes a plurality of conditions, and
wherein one of the plurality of conditions is that a period in which the printing apparatus is operated continuously in a state in which power is supplied to a memory of a controller of the printing apparatus is shorter in length than a threshold period.

10. The control method according to claim 1,
wherein the second processing is performed if the period that has elapsed without satisfaction of the shifting condition after the receiving of the instruction has reached a predetermined length.

11. The control method according to claim 10,
wherein an event that the period that has elapsed without satisfaction of the shifting condition after the receiving of the instruction has reached the predetermined length is an event that a predetermined number of determination processes of determining whether or not the shift condition has been satisfied after the receiving of the instruction has been performed.

12. The control method according to claim 1, further comprising:
determining that the shift condition has been satisfied after the receiving of the instruction,
wherein the performing of the first processing is to perform the first processing if the determining determines that the shift condition has been satisfied after the receiving of the instruction, and the performing of the second processing is to perform the second processing if the determining does not determines that the shift condition has been satisfied during a predetermined period after the receiving of the instruction.

13. The control method according to claim 1, further comprising:
counting, after the receiving of the instruction, the length of the period that has elapsed without satisfaction of the shift condition after the receiving of the instruction,
wherein the second processing is performed in accordance with the length of the period having been counted after the receiving of the instruction.

14. A printing apparatus, comprising:
a printer device; and
a controller that includes a processor and a memory, wherein the controller is configured to function as:
a receiving unit configured to receive an instruction for turning off the printing apparatus;
a first processing unit configured to perform, if a shift condition for shifting the printing apparatus into a predetermined power saving state has been satisfied after the receiving of the instruction, first processing for shifting the printing apparatus into the predetermined power saving state; and
a second processing unit configured to perform, in accordance with a length of a period that has elapsed without satisfaction of the shifting condition after the receiving of the instruction, second processing for shifting the printing apparatus into a shutdown state, power consumption in which is lower than power consumption in the predetermined power saving state.

15. The printing apparatus according to claim 14, wherein the controller is further configured to function as:
a third processing unit configured to perform third processing for shifting, upon receiving another instruction for turning on the printing apparatus, the printing apparatus into a predetermined power state, in which power consumption is higher than the power consumption in the predetermined power saving state,
wherein time taken to shift the printing apparatus that is in the predetermined power saving state into the predetermined power state is shorter than time taken to shift the printing apparatus that is in the shutdown state into the predetermined power saving state.

16. The printing apparatus according to claim 14,
wherein, in the predetermined power saving state, power is supplied to a part only of the controller of the printing apparatus, is not supplied to other part of the controller, and is not supplied to the printer device of the printing apparatus.

17. The printing apparatus according to claim 16,
wherein the part of the controller includes a volatile memory.

18. The printing apparatus according to claim 16,
wherein, in the shutdown state, power is supplied to none of the part of the controller, the other part of the controller, and the printer device.

19. The printing apparatus according to claim 14,
wherein the first processing unit performs the first processing if the shift condition is satisfied after receiving the instruction, and
wherein the second processing unit performs the second processing if a length of the period that has elapsed without satisfaction of the shifting condition after receiving the instruction exceeds a predetermined length.

20. The printing apparatus according to claim 14,
wherein the controller is further configured to function as a determination unit that determines at least once whether the shift condition is satisfied or not after receiving the instruction,
wherein the first processing unit performs the first processing if it is determined that the shift condition is satisfied, and wherein the second processing unit performs the second processing if it is determined a predetermined number of times that the shift condition is not satisfied.

21. The printing apparatus according to claim 14, further comprising:
    a switch that is able to be operated by a user,
    wherein the instruction is received when the switch is turned off.

22. The printing apparatus according to claim 14,
    wherein the shift condition includes a plurality of conditions, and
    wherein one of the plurality of conditions is that a period in which the printing apparatus is operated continuously in a state in which power is supplied to a memory of a controller of the printing apparatus is shorter in length than a threshold period.

23. The printing apparatus according to claim 14,
    wherein the second processing is performed if the period that has elapsed without satisfaction of the shifting condition after the receiving of the instruction has reached a predetermined length.

24. The printing apparatus according to claim 23,
    wherein an event that the period that has elapsed without satisfaction of the shifting condition after the receiving of the instruction has reached the predetermined length is an event that a predetermined number of determination processes of determining whether or not the shift condition has been satisfied after the receiving of the instruction has been performed.

25. The printing apparatus according to claim 14, wherein the controller is further configured to:
    determine that the shift condition has been satisfied after the receiving of the instruction,
    wherein the performing of the first processing is to perform the first processing if it is determined that the shift condition has been satisfied after the receiving of the instruction, and the performing of the second processing is to perform the second processing if it is not determined that the shift condition has been satisfied during a predetermined period after the receiving of the instruction.

26. The printing apparatus according to claim 14, wherein the controller is further configured to:
    count, after the receiving of the instruction, the length of the period that has elapsed without satisfaction of the shift condition after the receiving of the instruction,
    wherein the second processing is performed in accordance with the length of the period having been counted after the receiving of the instruction.

\* \* \* \* \*